United States Patent

Sakai et al.

[11] 4,184,796
[45] Jan. 22, 1980

[54] GLOBOID WORM GEAR GENERATING METHOD

[76] Inventors: Takao Sakai, 2-5, Nankodai-2-chome, Izumi-shi; Minoru Maki, 2-3, Nishinodaira, Nagamachi, Sendai-shi; Hisashi Tamura, 104-3, Kamijomachi, Nagaoka-shi, all of Japan

[21] Appl. No.: 808,521

[22] Filed: Jun. 21, 1977

[30] Foreign Application Priority Data

Jun. 22, 1976 [JP] Japan .................................. 51-72808

[51] Int. Cl.² .......................... B23F 11/00; B23F 13/06
[52] U.S. Cl. .................................. 409/12; 51/52 R; 51/287
[58] Field of Search ..................... 51/52 R, 56 G, 287; 90/3, 4; 29/159.2

[56] References Cited

U.S. PATENT DOCUMENTS

| | | | |
|---|---|---|---|
| 1,797,461 | 3/1931 | Wildhaber | 51/52 R |
| 1,934,754 | 11/1933 | Wildhaber | 51/52 R |
| 2,935,887 | 5/1960 | Wildhaber | 29/159.2 |
| 3,641,708 | 2/1972 | Strejc | 51/287 |
| 3,875,635 | 4/1975 | Pavlov et al. | 51/287 |

*Primary Examiner*—Leonidas Vlachos
*Attorney, Agent, or Firm*—Armstrong, Nikaido, Marmelstein & Kubovcik

[57] ABSTRACT

An improvement of a globoid worm gear generating method based on the "basic member gear theory" and the "secondary action theory" both proposed by the same inventors is disclosed. In one form, the surface of a globoid worm generating tool is defined as the tooth surface of an intermediate gear by a conical surface whose semivertical angle Y, $0° \leq Y \leq 90°$. In another form, the surfaces of a globoid worm gear generating tool are defined by two conical surfaces whose semivertical angles are equal and satisfy the above condition and whose major axes as well as bottoms are coincident with each other so that both tooth surfaces of a worm may be simultaneously generated.

4 Claims, 10 Drawing Figures

LIMIT NORMAL POINT CURVE

LIMIT NORMAL POINT CURVE

4,184,796

GLOBOID WORM GEAR GENERATING METHOD

BACKGROUND OF THE INVENTION

The present invention relates to generally a globoid worm gear generating method and more particularly an improvement of a method for generating globoid worm gears having developable tooth surfaces.

The inventors reported "the basic member gear theory" in KIKAI GAKKAI RONBUN (Journal of Japan Society of Mechanical Engineers), 1955, Vol. 21, No. 102, Page 164, Sakai as well as "the secondary action theory" in the same, 1972, Vol. 38, No. 311, Page 1895, Sakai and Maki. High efficiency of globoid worm gears generated based on the above two theories has been proved and widely accepted in the art.

In generating the globoid worm gears having developable tooth surfaces (of the type reported in KIKAI GAKKAI DOENSHU RONBUN (Reports in Conference held by Japan Society of Mechanical Engineers), No. 740-15), (1) the intermediate gear tooth surface is a plane, and (2) the plane is in parallel with the axis of an intermediate gear. These conditions have restricted the freedom of globoid worm gear design, especially the design of low-gear-ratio worm gears.

In addition, there has been a defect that because of the use of a tool representing a plane, both the tooth surfaces of a worm cannot be generated simultaneously.

SUMMARY OF THE INVENTION

In view of the above, one of the objects of the present invention is to provide an improved method for generating globoid worm gears having developable tooth surfaces which method may substantially solve the above and other problems encountered in the prior art worm gear generating method based on the theories described above.

To the above and other ends, briefly stated the present invention provides a method for generating globoid worm gears based on the basic member gear theory characterized in that a conical surfaces is wholly or partially employed in a globoid worm generating tool as a tooth surface of an intermediate gear; and the semivertical angle Y of said conical surface is $0° \leq Y \leq 90°$.

The present invention will become more apparent from the following description of preferred embodiments thereof taken in conjunction with the accompanying drawings.

DESCRIPTION OF THE PREFERRED EMBODIMENTS

Figure 1:
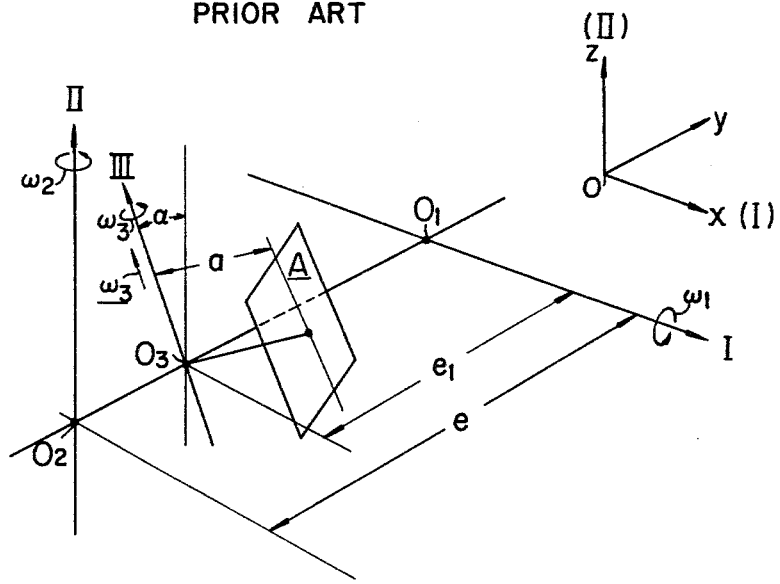
FIG. 1 shows the relationship between the axes of a worm, a wheel and an intermediate gear when the globoid worm gears are generated by the prior art method.

Prior Art, FIG. 1

Prior to the description of the present invention, the prior art globoid worm gear generating methods will be briefly described in order to help understanding of the present invention and to distinctly and specifically point out the problems encountered in the prior art methods.

Referring to FIG. 1, I denotes the axis of a worm; II, the axis of a wheel; and III, the axis of an intermediate gear when the globoid worm gears are generated based on the "basic member gear" and "secondary action" theories proposed by the inventors. In the Cartesian coordinate system O-xyz, the x-axis corresponds to the axis I; the y-axis, to the perpendicular $\overline{O_1 O_2}$ between the axes I and II; and the z-axis, the axis II. The axis III intersects at right angles the perpendicular $\overline{O_1 O_2}$ at $O_3$, and makes an angle $\alpha$ to the axis II. ($O_1$ and $O_2$ denotes the points of intersection between the perpendicular $\overline{O_1 O_2}$ and the axes I and II, respectively.)

Based upon our "basic member gear theory", the following three conditions or equations must be satisfied:

$$e_1 = e \cdot \cos^2 \alpha \qquad (1)$$

$$j = i \cdot \cos \alpha - \sin \alpha \qquad (2)$$

$$h = \omega_3/\omega_3 = e \cdot \sin \alpha \cdot \cos \alpha \qquad (3)$$

where $\omega_1, \omega_2, \omega_3$ are angular velocities of the axes I, II and III, respectively;

$\omega_3$ is a translation velocity of the axis III therealong;

$i = \omega_1/\omega_2;$ $j = \omega_1/\omega_3$ $h = \omega_3/\omega_3$ the ratio h being in term of pitch;

e = a distance between $O_1$ and $O_2$; and $e_1$ = a distance between $O_1$ and $O_3$.

The tooth surface of a gear cutting tool in any suitable configuration is attached to the axis III to machine a worm blank or work on the axis I and a wheel blank or work on the axis II. Then, the line of contact between the worm and wheel coincides with the line of contact between the intermediate gear and worm. This coincident line of contact is called "the first line of contact", and the globoid worm gear generating method described above is called "the indirect generating method".

When $\alpha=0$, the axis III coincides with the axis II, and when $\alpha=90°$, the axis III coincides with the axis I so that the intermediate gear may not be taken into consideration. Thus, the gear generating method wherein $\alpha=0$ or 90° is called "the direct generating method".

According to the "secondary action theory", when a worm wheel is directly generated by a generating tool wholly or partially similar in configuration to a worm generated by an intermediate gear which satisfies the above equations (1), (2) and (3), the worm and wheel contact with each other along another line of contact (called "the second line of contact") in addition the first line of contact. Furthermore, at a point where the worm and wheel contact only one time (to be referred to "limit normal point"), the relative radius of curvature becomes infinity ($\infty$). In practice the curve (to be referred to as "limit normal point" curve) at which the relative radius curvature becomes infinity ($\infty$) is preferably within the zone of contact between the worm and wheel so that there arises the problem how to determine the tooth profile of the intermediate gear.

In the globoid worm gear generating method previously proposed by the inventors, the tooth surface of the intermediate gear is a plane A (See FIG. 1) in parallel with the intermediate-gear axis III and spaced apart therefrom by a distance a. The employment of this plane results in the advantage that the translation of the axis III may be eliminated. Furthermore, the "limit normal point curve" can be brought into the zone of contact so that high efficiency worm gears have been produced.

In Japanese Pat. Publication No. 50-19688, Ishikawa disclosed his observation on the direct worm gear generating method corresponding to the indirect worm gear generating method proposed by the inventors wherein $\alpha=0$. He proposed to employ as the tooth surface of an intermediate gear a plane in parallel with or inclined relative to the axis of the intermediate gear.

Furthermore, Shimokoube, Toyoyama and Suzuki made studies and researches on the globoid worm gear generating method by the use of gear generating tools having a conical surface, as reported in KIKAI GAKKAI RONBUN (Journal of Japan Society of Mechanical Engineers) 1973, Vol. 39, No. 322. Their gear generating method is very unique in that the above conditions or equations are not satisfied.

As far as the worm wheel is concerned the above three gear generating methods all use the "direct gear generating method".

THE INVENTION

The globoid worm gear generating method in accordance with the present invention is based on the "basic member gear" and "secondary action" theories proposed by the inventors so that the above three conditions or equations must be equally satisfied. In addition, the essential feature of the present invention resides in the fact that the tooth surface of an intermediate gear employs a conical surface (or plane in a special case).

Figure 2:
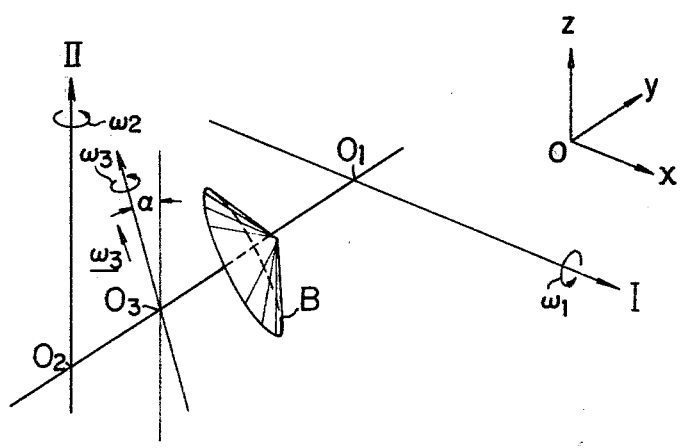
FIG. 2 shows the relationship between the axes of a worm, a wheel and an intermediate gear when the globoid worm gears are generated by the method in accordance with the present invention.
Figure 3:
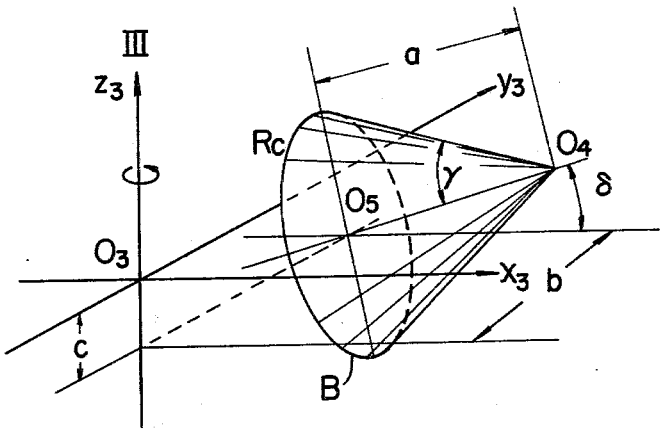
FIG. 3 is a view, on enlarged scale, showing the relationship between the tooth surface and axis of an intermediate gear used in the present invention.

As shown in FIG. 2, the tooth surface of an intermediate gear consists of a conical surface B, and FIG. 3 shows the positional relationship between the axis of the intermediate gear and the tooth surface thereof. The conical surface B has a semivertical angle Y and the major axis $\overline{O_4O_5}$ ($O_4$ being the apex of the cone), and the $z_3$ axis of the Cartesian coordinate system $O_3-X_3Y_3Z_3$ coincides with the axis III of the intermediate gear. The major axis $O_4O_5$ lies in the plane $(y=b)$ and is inclined at an angle $\delta$ with respect to the plane $X_3Y_3$ $(Z=0)$. Thus, the point $O_5$ is the intersection between the major axis $O_4O_5$ and the plane $Y_3Z_3$ $(Z=0)$ and has the coordinates $(O, b, -c)$. And $O_4O_5=a$.

The tooth surface (conical surface B) of the intermediate gear is defined by a grinding wheel or milling cutter in practice, but the grinding wheel is employed in examples to be described below.

Figure 4:
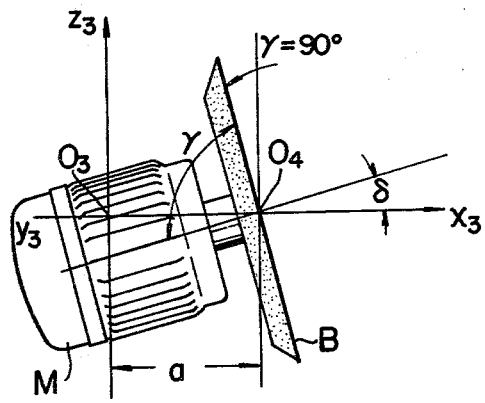
FIG. 4 shows a first example wherein the semivertical angle Y is 90°.

In the first example shown in FIG. 4, Y or semivertical angle of the cone is 90° and is therefore a special case in which the tooth surface is flat.

Figure 5:
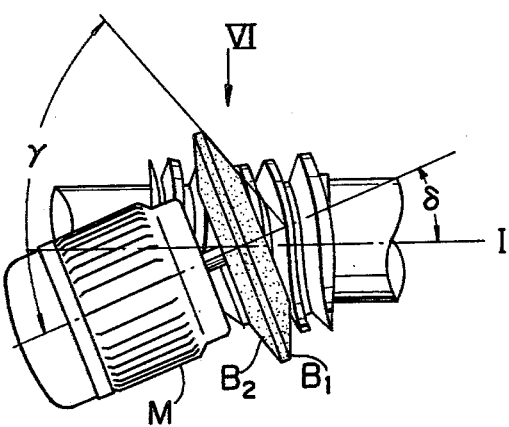
FIG. 5 shows a second example wherein the semivertical angle $\alpha$ is 0 and c=0.
Figure 6:
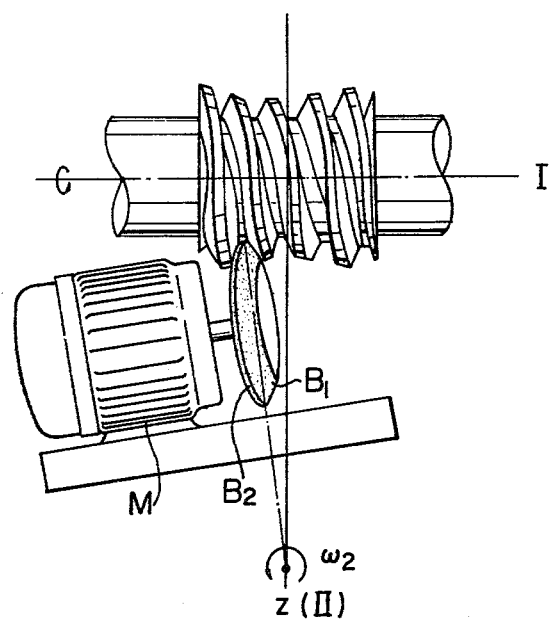
FIG. 6 is a view taken in the direction indicated by the arrow VI of FIG. 5.

In the second example shown in FIGS. 5 and 6, $c=0$ and $\alpha=0$. Since $c=0$, the major axes of two conical surfaces $B_1$ and $B_2$ coincide with each other so that both right and left tooth surfaces of a worm may be generated simultaneously. In addition, since $\alpha=0$, the axes of the intermediate gear and wheel coincide with each other; that is, the "direct gear generating method".

Next the globoid worm gears generated by the prior art method and the method in accordance with the present invention will be compared in some important respects.

The prior art method has two independently variable parameters (for instance a and $\alpha$) while the present invention has six independently variable parameters (for instance, $\alpha$, $\delta$, Y, a, b and c). With the prior art method, the design of low reduction-ratio worm gears has been difficult, but according to the present invention the design has been much simplified. More particularly, the "limit normal point curve" may be suitably approached to the axis of a worm, and the ineffective tooth surface portion may be reduced. (The term "ineffective tooth surface portion" refers to a portion bounded by the "limit normal point curve" and the axis of a worm on the tooth surface of the worm. The "ineffective tooth surface portion" causes the undercut, it is preferable to remove it prior to the gear generating step. Thus, this portion is referred to as "ineffective".)

Figure 7:
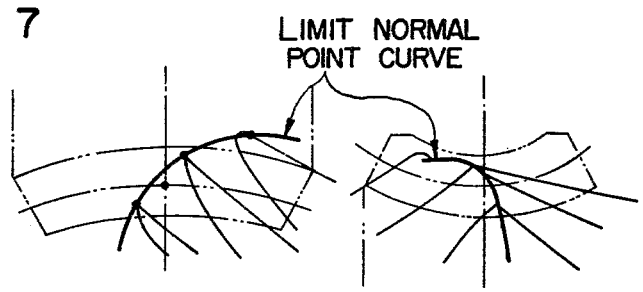
FIG. 7 shows the line of contact and the limit normal point curve when the globoild worm gears are generated by the prior art method.
Figure 8:
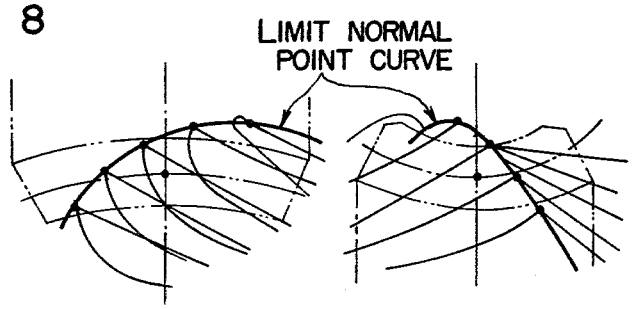
FIG. 8 shows the line of contact and the limit normal point curve when the globoid worm gears are generated by the method in accordance with the present invention.

The more detailed comparison will be made with further reference to FIGS. 7 and 8 wherein $Y=90°$; that is, a generating tool with a plane tooth surface is used and $\delta=0$. It is seen that the "limit normal point curve" (FIG. 8) of the present invention is more closely approached to the axis of the worm than the "limit normal point curve" of the prior art (See FIG. 7). Since Y is 90°, the remaining independently variable parameters are five, but opposed to a generating tool having a conical tooth surface, the tooth profiles remain unchanged independently of the diameter of a generating tool. Thus the freedom of design can be much increased while retaining the desirable features of the globoid worm gears having developable tooth surfaces. Especially, the design of low gear-ratio worm gears is much simplified.

From the standpoint of machining, the prior art method cannot simultaneously machine both the right and left tooth surfaces of a worm with one generating tool, but according to the present invention, the major axes of two conical surfaces of a generating tool coincide with each other when $c=0$ so that both the right and left tooth surfaces can be simultaneously generated with a single gear generating tool (See FIGS. 5 and 6). In addition, the freedom of design is greater than the prior art so that desired line of contact and "limit noraml point curve"" may be obtained.

Figure 9:
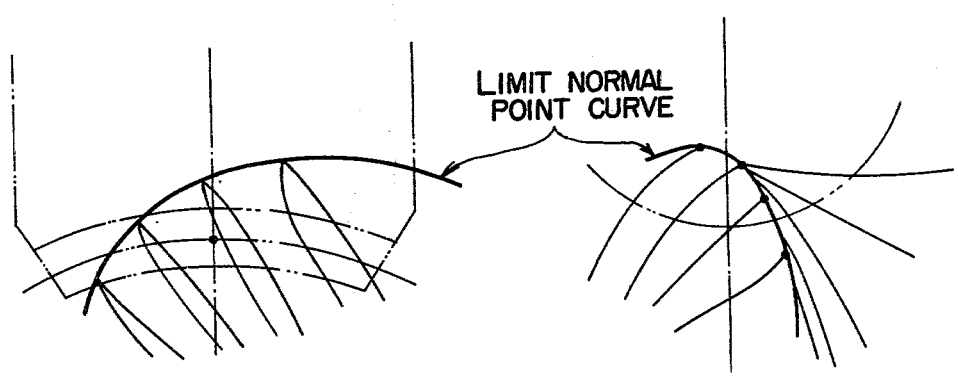
FIG. 9 shows the line of contact and the limit normal point curve when the globoid worm gears with Y=70°, c=0 and $\alpha \neq 0$ are generated by the method in accordance with the present invention.
Figure 10:
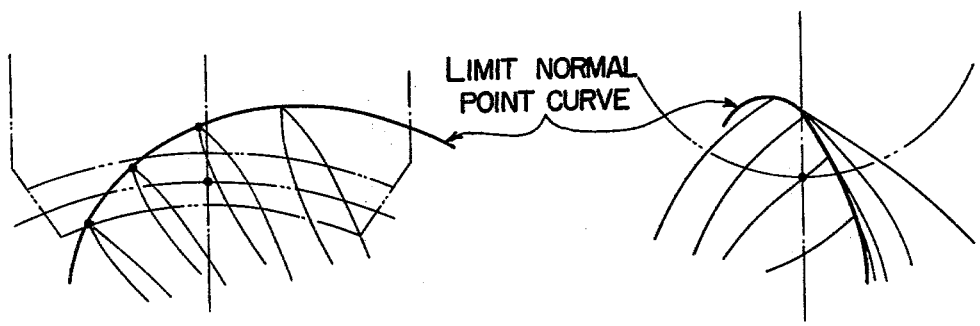
FIG. 10 shows the line of contact and the limit normal point curve when the globoid worm gears with Y=70°, c=0 and $\alpha=0$ are generated by the method in accordance with the present invention.

This will be further described in detail with reference to FIGS. 9 and 10. In FIG. 9, $\alpha=0$, $c=0$ and $Y=70°$ while in FIG. 10, $\alpha=0$, $c=0$ and $Y=70°$ so that the direct generating method is employed. As a result, the machining may be further simplified advantageously in practice, and furthermore four independently variable parameters (for instance, $\delta$, $Y$, a and b) are still available so that the present invention has a greater freedom than the prior art methods.

In summary, according to the present invention globoid worm gears can be more freely designed and machined as compared with the prior arts, and is especially useful in designing and machining low gear-ratio worm gears.

What is claimed is:

1. A method for generating globoid worm gears consisting of a worm rotating at an angular velocity $\omega_1$ and a worm wheel rotating in engagement with said worm at an angular velocity $\omega_2$ about an axis perpendicular to and spaced apart by a distance from the axis of said worm, said method comprising the steps of:

(a) preparing a machining tool having at least one conical generating surface whose semivertical angle Y is $0° \leq Y \leq 90°$ and whose major axis is inclined at an angle $\delta$, which is $-60° \leq \delta \leq 60°$, with respect to a plane perpendicular to the axis of said machining tool;

(b) disposing said machining tool in such a way that the axis of said machining tool meets at right angles with a common perpendicular between the axes of said worm and said worm wheel at a position spaced apart from the axis of said worm by a distance e1, which is $\leq e$, and is inclined at an angle $\alpha$ with respect to the axis of said worm wheel, said angle $\alpha$ being determined from an equation $e_1 = e \cos^2 \alpha$;

(c) rotating a worm blank about the axis of said worm at said angular velocity $\omega_1$;

(d) rotating said machining tool about the axis thereof at an angular velocity $\omega_3$ while displacing said machining tool in the axial direction thereof at a translation velocity $\omega_3$ thereby moving said conical generating surface along a helical path about the axis of said machining tool to generate a worm tooth surface on said worm blank with said conical generating surface, said angular velocity $\omega_3$ being determined from an equation $j = i \cdot \cos \alpha - \sin \alpha$ where $i = \omega_1/\omega_2$ and $j = \omega_1/\omega_3$, and said translation velocity $\omega_3$ being determined from an equation $\omega_3 = e \cdot \omega_3 \cdot \sin \alpha \cdot \cos \alpha$;

(e) preparing a hob corresponding to said generated worm;

(f) rotating a worm wheel blank about the axis of said worm wheel at said angular velocity $\omega_2$; and (g) rotating said hob about the axis of said worm at said angular velocity $\omega_1$ thereby directly generating a worm wheel tooth surface on said worm wheel blank.

2. A method as set forth in claim 1, in which when a righthanded cartesian coordinate system $O_3 - X_3 Y_3 Z_3$ is employed with the $Z_3$—axis coinciding with the axis of said machining tool and the origin $O_3$ coinciding with the intersection between the axis of said machining tool and the perpendicular between the axes of said worm and said worm wheel, the major axis of said conical generating surface is laid in a plane $Y_3 = b$, which is $-e \leq b \leq e$, and passes a point $(0, b, -c)$, in which c is $-Rc \leq C \leq Rc$ where Rc is a radius of the base of said conical generating surface.

3. A method as set forth in claim 2, in which said angle of inclination $\alpha$ of the axis of said machining tool is in the range of $-50° \leq \alpha \leq 50°$.

4. A method as set forth in claim 3, in which said machining tool has a pair of said conical generating surfaces having a same semivertical angle Y and a same height and coaxially arranged with their bottoms being faced, whereby opposed tooth surfaces of a worm may be simultaneously generated with said pair of conical generating surfaces.

* * * * *